Oct. 2, 1934. L. LEBEL 1,975,278
LIFTING JACK APPARATUS FOR VEHICLES
Filed Feb. 13, 1932  4 Sheets-Sheet 2
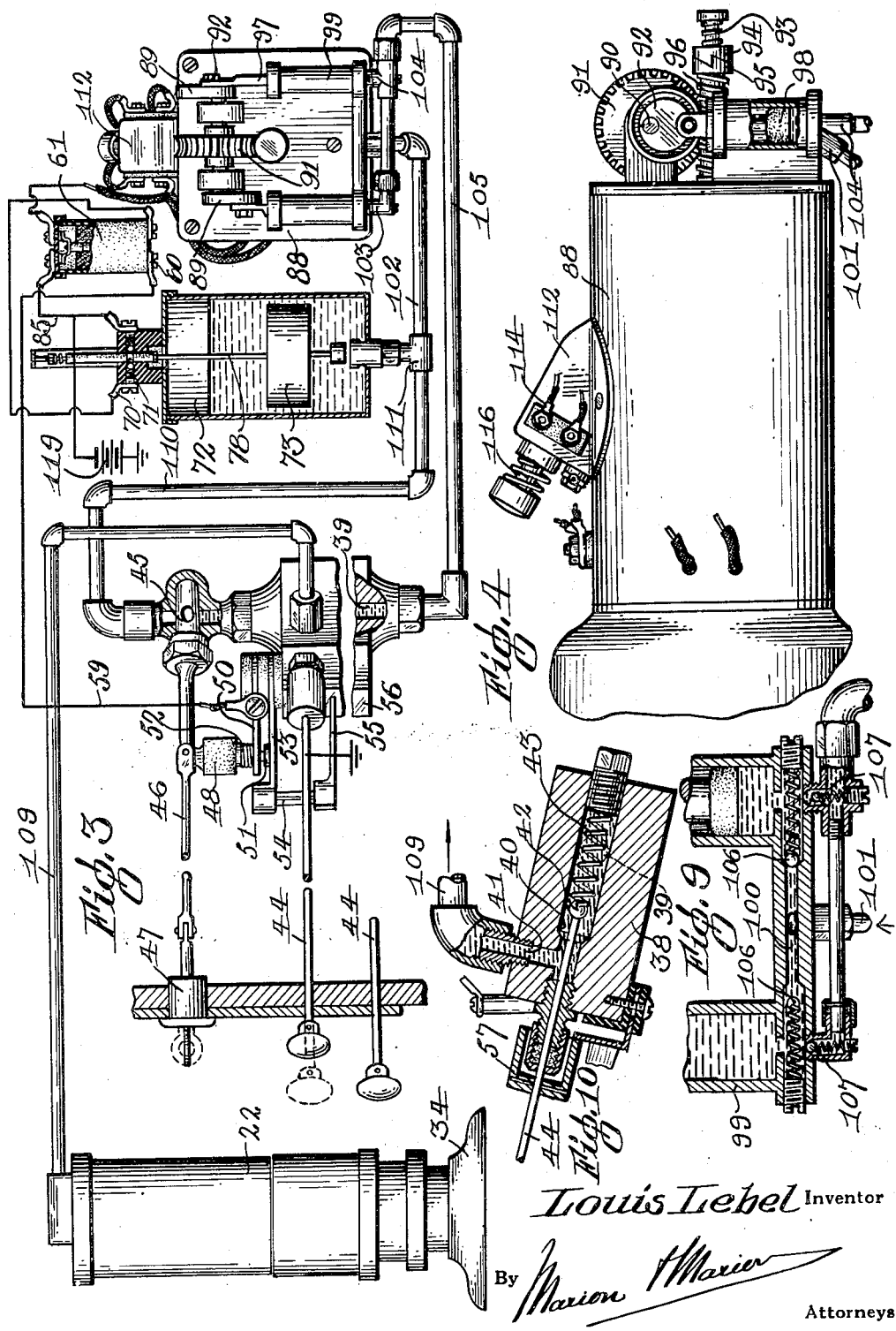
Louis Lebel Inventor
By
Attorneys

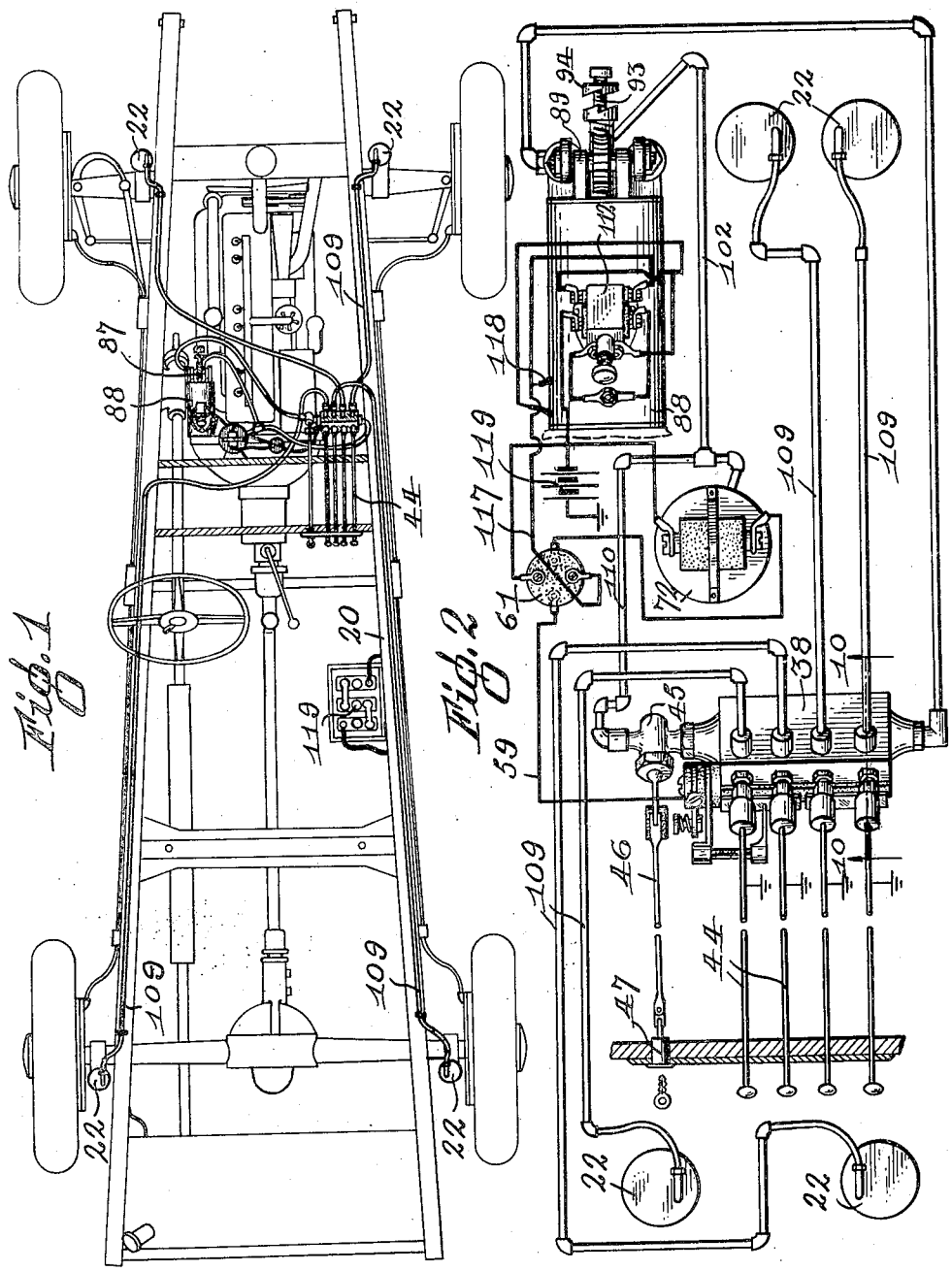

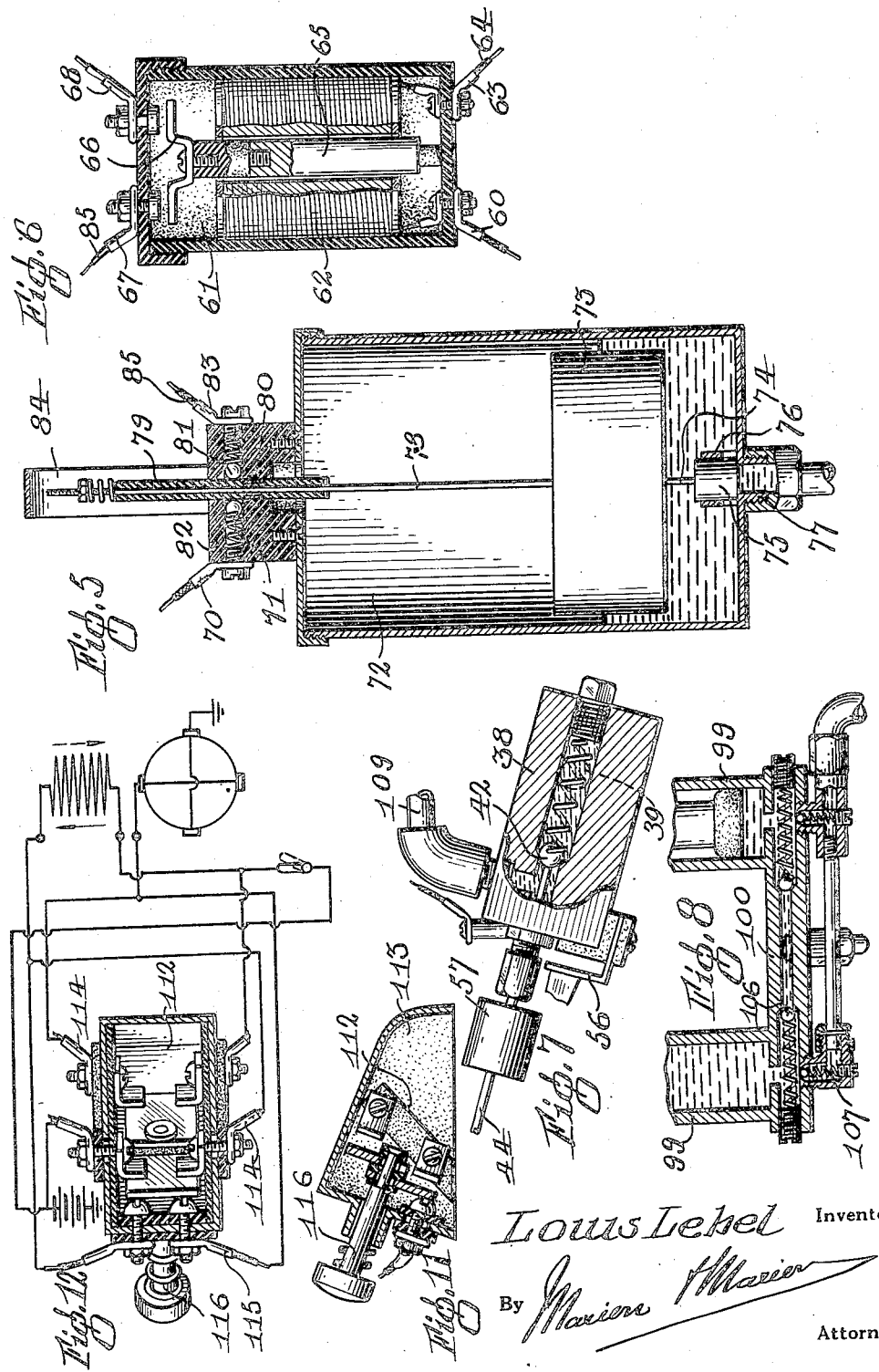

Oct. 2, 1934.         L. LEBEL         1,975,278
LIFTING JACK APPARATUS FOR VEHICLES
Filed Feb. 13, 1932    4 Sheets-Sheet 4
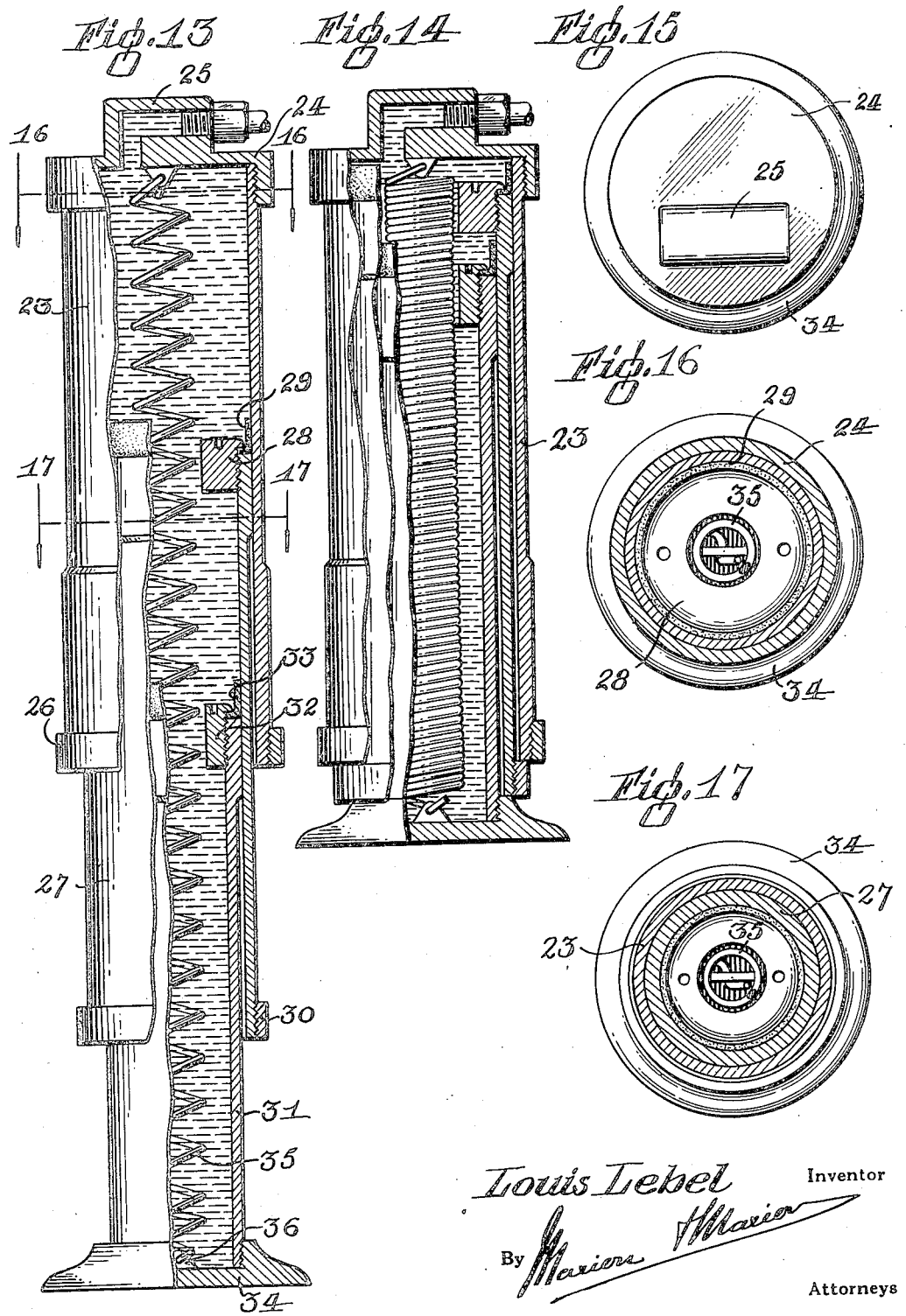

Patented Oct. 2, 1934

1,975,278

UNITED STATES PATENT OFFICE 1,975,278

LIFTING JACK APPARATUS FOR VEHICLES

Louis Lebel, Montreal, Quebec, Canada, assignor to Joseph J. Rosenthal, New York, N. Y.

Application February 13, 1932, Serial No. 592,797

1 Claim. (Cl. 60—52)

The present invention relates to lifting jack apparatus for automobiles and similar vehicles.

An important object of the invention is the provision of lifting jack apparatus operable for raising the vehicle to effect repairs to the tires and other purposes.

A further object of the invention is the provision of a lifting jack apparatus embodying a plurality of jacks attached to the axles adjacent the wheels selectively operable from a conveniently situated control position.

Another object of the invention is the provision of lifting jack apparatus of the above type wherein the respective lifting jacks may be actuated to a lifting or to a retracted position upon operation of a simple manual control mechanism.

Still another object of the invention is the provision of a lifting jack apparatus embodying means for locking the system to prevent unauthorized operation thereof.

A still further object of the invention is the provision of a lifting jack apparatus for vehicles which will be efficient, rapid and reliable in operation and which can be installed without difficulty upon a vehicle.

Other objects and advantages of the invention will become apparent as the description progresses.

In the accompanying drawings forming a part of this specification and in which like reference characters are employed to designate corresponding parts throughout the same:

Figure 1 is a top plan view of a vehicle chassis showing the lifting jack apparatus operatively installed thereon, Figure 2 is a top plan view of the assembled apparatus, Figure 3 is an enlarged assembly view illustrating the essential units of the system, Figure 4 is a side elevational view of the pump and pump operating mechanism, Figure 5 is a vertical sectional view through the fluid reservoir and the automatically controlled switch mechanism, Figure 6 is a similar view through the auxiliary electromagnetic circuit switch, Figure 7 is an end view of the distributing manifold, partly in section, Figure 8 is an enlarged fragmentary transverse section through the pumping mechanism in one position thereof, Figure 9 is a similar view showing the disposition of the valve structure in another position, Figure 10 is a transverse section through the manifold taken on the line 10—10 of Figure 2, Figure 11 is a longitudinal section through the pump motor switch, Figure 12 is a longitudinal horizontal section through the same, Figure 13 is a broken side elevational view of one of the jacks in extended lifting arrangement, Figure 14 is a similar view showing the jack in collapsed or retracted arrangement, Figure 15 is a top plan view of the same, Figure 16 is a transverse sectional view taken on the line 16—16 of Figure 13, and Figure 17 is a similar view taken on the line 17—17 of Figure 13.

Referring to the drawings, wherein for the purpose of illustration is shown a preferred embodiment of the invention, the numeral 20 generally designates a conventional form of automobile chassis.

To the front and rear axles are connected a plurality of lifting jacks 22, in the present instance embodying four jacks attached to the axles adjacent the wheels. Each of the jacks embodies a series of telescopically connected sections consisting, in the present instance, of a main outer section 23 of elongated cylindrical form open at the bottom and having secured on the top end a closure cap 24. On the cap 24 is formed an angular connecting port 25 projecting upwardly therefrom. On the bottom end of the section 23 is threadedly secured an external ring 26.

An intermediate section 27 of tubular form is fitted for slidable movement interiorly of the section 23 and is provided at the upper end with an interior annular reinforcing collar 28 which also serves to retain in proper position an annular packing ring 29. Upon the lower end of the section 27 is also threadedly mounted an exterior reinforcing ring 30.

A bottom jack section 31 of elongated cylindrical form is slidably fitted within the intermediate section 27, and is provided with an annular collar 32 disposed within the upper end portion securing in position a packing ring 33. Upon the lower end of the section 31 is detachably secured an annular foot plate 34.

A coiled tension spring 35 is extended longitudinally through the respective jack sections, having its lower extremity connected with an apertured ear 36 formed on and projecting upwardly from the foot plate 34 and with a similar ear depending from the centre portion of the cap 24. The spring 35 is designed to normally urge the jack forming sections to retracted nested positions.

Each of the jacks is in communication with a distributing header 38, which is in the form of an elongated block provided with a main longitudinal bore 39 extending therethrough from end to end. Extending transversely through the block and intersecting the longitudinal bore 39 are a plurality of passages 40, formed to provide a reduced portion adjacent the front face of the block. Communicating with the reduced portion of each transverse passage 40 is an outlet bore 41. In each transverse passage 40 of the block is disposed a ball valve 42 normally urged to a seated closing position by means of a coiled compression spring 43.

The ball valve 42 of each of the distributing passages may be actuated to an open position through the medium of an operating rod 44 extending through a bushing in the forward face of the block and preferably through the instrument board of the vehicle.

In an extension of the longitudinal bore, at one end of the block, is mounted a return control valve 45 having an extension operating mechanism 46 connected therewith. The mechanism 46 is operatively associated with a key controlled lock 47, preferably disposed in the instrument board. Attached to and projecting laterally from the valve extension mechanism 46 is an arm 48, the purpose of which will be presently described.

Attached to and projecting from one end of the manifold block 38 is a fixed arm 50 carrying adjacent its outer extremity a slidably operable contact button 51 normally urged to an extended position in one direction by means of a spring 52.

Adjacent the arm 50 is mounted an extension bracket 53 supporting at its outer end one end of a fuse 54. The opposed end of the fuse is supported by a complementary bracket 55 extending outwardly from and having contact with a longitudinal contact plate 56. The plate 56 is preferably angular in cross section attached to the forward face of the manifold block and insulated therefrom. Attached to each of the valve operating rods 44 is a cylindrical conducting element 57 disposed to contact with the longitudinally extending conducting plate 56 when the rod is depressed.

Thus, when the lifting jack mechanism is inoperative, the return control valve 45 is in open position and the arm 48 swung to a position out of contact with the member 51. To enable operation of the jacks, it is initially necessary to insert a proper key in the lock 47 so as to rotate the barrel therein, the valve operating mechanism gear 46 and to actuate the valve 45 to a cut-off position. Simultaneously with this operation, the arm 48 is swung about and contacts with the conducting medium 51, sliding the same from its normal outwardly projected position to a depressed arrangement, wherein the inner extremity will engage the bracket 53, completing an electric circuit, which will be more fully described hereinafter, through the arm 50, member 51, the brackets 53 and 55 through the fuse and the contact plate 56. Thereafter, depression of any of the rods 44 will close this electric circuit by grounding it through the rods.

If, however, the rods 44 are actuated previously to the unlocking operation described in the foregoing, no operative action is effected and unauthorized or accidental movement of the valve operating rods under these conditions will not cause extension of the jacks.

One end of an electric conductor 59 is connected with the arm 50 while the opposed end is connected to a terminal 60 of an electro-magnetic switching mechanism 61. The terminal 60 connects with one extremity of the armature 62 while, to the opposed terminal of the armature, indicated at 63, is connected one end of a conductor 64. When the armature 62 is energized, the core 65, which normally assumes a lowered position, is elevated, causing a contact bar 66 attached to the upper end thereof to engage a pair of spaced terminals 67 and 68 mounted on the top of the switch.

The conductor 64 extends from the terminal 63 to a terminal 70 of an automatic circuit operating switch 71. The switch 71 is mounted on the top of a cylindrical reservoir 72 providing a storage container for the jack operating fluid, such as oil. In the reservoir 72 is mounted a float 73 having projecting from the centre of the lower face a relatively short extension rod 74. To the lower end of the rod 74 is connected a cylindrical valve plug 75 co-operating with a valve housing 76 to control the flow of the fluid with respect to an outlet 77 formed in the bottom of the container or tank 72.

Attached to the float 73 and projecting upwardly therefrom is a relatively long stem 78 having fixed on the upper portion an insulating sleeve 79 and projecting through an aperture in the centre of the tank top. At a predetermined position on the sleeve 79 is secured an annular contact ring 80 formed of conducting material. The ring 80, at predetermined positions of the float 73, is elevated and contacts with a pair of contact balls 81 mounted in diametrically opposed passages in an insulating housing 82 and pressed, by means of springs, into engagement with the sleeve 79. When the float is in an elevated position, the ring 80 contacts with the balls 81 and closes a circuit between the terminal 70 and a complementary terminal 83 through the medium of the metallic compression springs urging the balls against the stem.

Upward movement of the float 73 and the stem 78 is limited by a bracket 84 fixed on top of the tank and extending over the stem.

A conductor 85 joins the terminal 83 of the float actuated switch 71 with the terminal 67 of the electro-magnetic switch 61.

Forced circulation of the fluid is effected through the medium of pumping mechanism, generally indicated at 87. In the present instance, this pump is formed jointly with the motor starter, generaly indicated at 88, and embodies a pair of bearing brackets 89 projecting forwardly from the starter casing and supporting a transverse shaft 90 journaled therein. To the central portion of the shaft 90 is connected a worm wheel 91. To the ends are eccentrically connected a pair of annular cam plates 92 provided with an annular groove in the outer face of each.

The rotor shaft of the starter motor extends through the forward portion of the casing and is provided with a screw threaded extension 93. Loosely threaded on the extension 93 is a clutch section 94 adapted to co-operate with a complementary section 95 secured on the outer end of a sleeve 96 formed to provide exteriorly thereon a worm gear meshing with the worm wheel 91.

When the shaft extension 93 is rotated in a clockwise direction the sudden rotary movement thereof will move the clutch section 94 inwardly into engagement with the complementary section 95 and cause rotation of the worm gear 96 with the shaft. This movement of the worm gear will cause rotation of the worm wheel 91 and eccentric rotary movement of the cam plates 92. Connected with the cam plates, by means of rollers engaging the grooves therein, are complementary piston rods 97 connected with pistons 98 disposed for vertical reciprocating movement in pump cylinders 99.

Extending between and having connection with the lower ends of the cylinders 99 is a cylinder header conduit 100 having connected to and communicating with the intermediate portion thereof an inlet connection 101. The inlet connection 101 is connected with a conduit 102 which also communicates with the reservoir 72. Through the lower ends of the cylinders 99 the fluid is discharged through outlets 103 and 104 which communicate with a common feed pipe 105, through the medium of which the fluid is conducted to the manifold.

In the ends of the connecting conduit 100 are mounted check valves 106 while in the discharge outlets 103 and 104 are disposed check valves 107. Thus, during the upward intake movement of the piston in one of the cylinders 99, the valve 106 in the lower portion thereof will be opened for the intake of fluid from the conduit 101 into this cylinder. During the downward movement of the piston, in the course of the pressure stroke, the valve 106 is automatically closed to prevent the fluid returning into the conduit 101 while the valve 107 in the bottom of the cylinder will be forced to an open position and the fluid caused to flow through the conduit 105 into the manifold.

Communication between each of the jacks and the manifold is afforded through the medium of a plurality of jack delivery conduits 109, one end of each conduit having connection with the angular fitting 25 formed on the jacks, while the opposed end is connected with one of the outlets 41 of the manifold.

During the operation of retracting the jacks to their normal inoperative positions, the fluid therefrom is returned to the reservoir 72 through the medium of a return conduit 110 having one end connected with the valve 45 disposed at the discharge end of the manifold while the opposed end connects with a T-fitting 111 having communication with the reservoir through the port in the lower end thereof.

As I contemplate the utilization of the starter motor for the operation of the pump 87 I provide a special switch structure, generally indicated at 112, and shown to advantage in Figures 11 and 12. This switch mechanism embodies a housing 113 attached to the starter casing having a series of inwardly disposed contacts having connection with side terminals 114. Against the forward end wall of the casing are secured a separate set of contacts having connection with exterior front terminals 115. As shown, the terminals 114 and 115 are so connected with the brush and field armature, respectively, of the starter motor as to enable operation of the motor in one direction when employed for starting purposes and operation in a reverse direction in order to drive the pumping apparatus.

Therefore, when the starter switch operating stem 116 is in its normal position, extended by a spring, the contact attached to the inner end of the stem will engage the front contacts having connection with the terminals 115 so that the switch is normally set to actuate the motor in a direction suitable for operating the pump. As shown in Fig. 2, a conductor 117 extends from the terminal 69 of the electro-magnetic switch 61 to and connects with a terminal 118 of the starter motor field armature. The circuit is continued through the field armature to the contact 114 and the contact terminals 115 through the brush and to the vehicle battery 119.

When the starter is to be employed, the stem is depressed to throw the stem contact into engagement with the contact having connection with the side terminals 114 to energize the motor circuit through the battery and cause rotation of the rotor in a direction reverse to that effected during the operation of the pump.

The apparatus is operated as follows: When all of the jacks are inoperative the lock controlled mechanism 46 is disposed as shown in Figure 2, the valve 45 being in open arrangement so that the return fluid conduit 110 is fully open and the arm 48 is swung out of engagement with the switch element 51 which is automatically urged to a circuit breaking position.

To operate one of the jacks, a key is inserted into the lock 47 and rotated so as to simultaneously rotate the mechanism 46 causing closing adjustment of the valve 45 and the arm 48 to engage and depress the switch member 51. The member 51 is thus forced into engagement with the bracket member 53, as shown to advantage in Figure 3. Upon depressing one of the valve rods 44, one of the ball valves 42 is unseated and immediately thereafter the contact member 57 attached to the rod is brought into contact with the plate 56. Thus, the electric circuit is closed so that the electro-magnetic switch 61 is energized through the armature and the core 65 thereof is elevated so that its contact member 66 will engage the terminal contacts 67 and 69 and cause a relatively small current to flow through the float switch 71.

Inasmuch as the reservoir will contain the full charge of fluid, the stem 78 will be disposed in its elevated position so that the current can flow through the ball contacts of the switch and through the ring 80 which will be in engagement therewith. Simultaneously therewith, the starter motor is actuated through the conductors 85 and 117.

The operation of the motor will actuate the pumping mechanism so that the fluid from the reservoir 72 is drawn therefrom, the valve member 75 being raised due to the elevated position of the float. The fluid is conducted from the reservoir, through the medium of the pump, through the delivery conduit 105 into the distributor manifold 38 and discharged through one of the conduits 109 to the jack to be extended.

When a sufficient quantity of fluid has been discharged to the jack to fully extend the same, the extraction thereof from the reservoir will cause the float 73 to drop so as to simultaneously break the circuit through the switch 71 by means of the ring 80 moving out of contact with the contact balls 81 and also cause the valve member 75 to attain a seated position closing the discharge outlet in the bottom of the reservoir. By thus automatically breaking the electric circuit the motor and pump are rendered inactive, the valves 107 becoming automatically closed to retain the fluid pressure in the delivery fluid circuit and the jack.

To restore the jack to its normal retracted arrangement, the lock operating key together with the valve gearing 46 is rotated to its former locking position whereupon the valve 45 will be opened and the fluid forced through the conduits 109, through the manifold and discharged through the return conduit 110 into the storage reservoir 72. Thus, the jacking apparatus is brought to its normal inoperative arrangement and is also locked so that further operation of any jack can only be effected by again unlocking the control mechanism.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In hydraulic jack apparatus for motor vehicles, the combination of extensible jacks secured to a vehicle, means for selectively controlling the flow of a liquid to any of said jacks, means for pumping liquid from a liquid supply reservoir to said jacks through the fluid controlling means, a float in said reservoir actuating an electric switch when all the liquid has been pumped from the reservoir into a jack, a switch connected in series with the float switch, a valve permitting return of the fluid pumped in a jack to the reservoir when in the open position, a key operated device for simultaneouly actuating both said last named switch and said valve, and a plurality of manually operated switches actuated by the liquid controlling means, said switches being also connected in series with the key operated and float switches and an electric current source and the motor, whereby upon actuating the key operated switch to closed position the valve will also be closed and the motor actuated upon adjusting the controlling means to direct liquid from the reservoir into a selected jack, the motor circuit being automatically opened by the float switch when the reservoir has been emptied, whereupon movement of the key operated switch to the off position will permit return of the liquid from the jack back into the reservoir for another cycle of operation.

LOUIS LEBEL.